(12) United States Patent
Hirata et al.

(10) Patent No.: US 7,635,437 B2
(45) Date of Patent: Dec. 22, 2009

(54) METHOD OF MANUFACTURING NEAR FIELD LIGHT GENERATION ELEMENT

(75) Inventors: Masakazu Hirata, Chiba (JP); Manabu Oumi, Chiba (JP); Koichi Shibata, Chiba (JP)

(73) Assignee: Seiko Instruments Inc. (JP)

( * ) Notice: Subject to any disclaimer, the term of this patent is extended or adjusted under 35 U.S.C. 154(b) by 687 days.

(21) Appl. No.: 11/360,278

(22) Filed: Feb. 23, 2006

(65) Prior Publication Data

US 2006/0261177 A1 Nov. 23, 2006

(30) Foreign Application Priority Data

Apr. 26, 2005 (JP) .............................. 2005-127525
Jul. 19, 2005 (JP) .............................. 2005-208670

(51) Int. Cl.
*B29D 11/00* (2006.01)
*B44C 1/22* (2006.01)

(52) U.S. Cl. .......................................... 216/24; 216/11
(58) Field of Classification Search ................... 216/11, 216/24

See application file for complete search history.

(56) References Cited

FOREIGN PATENT DOCUMENTS

JP          09259379 A     *  10/1997

* cited by examiner

*Primary Examiner*—Roberts Culbert
(74) *Attorney, Agent, or Firm*—Adams & Wilks

(57) ABSTRACT

A near field light generation element is manufactured by forming a truncated quadrangular pyramid on a substrate by forming an etching mask having a shape the same as but larger than that of a top face of the truncated quadrangular pyramid, and isotropic etching the substrate using the etching mask. Thereafter, metal films are formed on two opposite side faces of the truncated quadrangular pyramid by injecting a vacuum deposition source from a front of each of the faces and a direction parallel to the substrate.

20 Claims, 10 Drawing Sheets

METHOD OF MANUFACTURING NEAR FIELD LIGHT GENERATION ELEMENT

BACKGROUND OF THE INVENTION

1. Field of the invention

This invention relates to a method of manufacturing a near field light generation element which generates a near field light.

2. Description of the Related Art

The near field light generation element is used in an optical head in an optical storage device performing a high density information record/regeneration, an optical probe in a near field light microscope performing an observation under a high resolution, and the like. Since a near field light technique can treat an optical information of a minute region exceeding a diffraction limit of light, it is expected that there are obtained a high recording density and a high resolving power, which are not capable of being attained by a conventional, optical technique.

In the near field light generation element, it is a main problem to obtain a spot of the near field light which is minute and strong. For that purpose, several forms are already proposed. In Patent Document 1, by making a contour shape of an optical aperture having been provided in a tip of the near field light generation element into a triangle and by being made a structure in which a polarization direction of an incident light and one side of the triangle intersect perpendicularly, there is generated the strong near field light having been localized to that one side (triangle aperture system). In Non-Patent Document 1 and Patent Document 2, metal films are formed on two opposite faces among four side faces of a quadrangular pyramid, these two faces have a gap, which is the same as or smaller than a wavelength of the light, in the vicinity of an apex of the quadrangular pyramid, each of the metal films on the two faces has respectively in its gap part an apex whose radius of curvature is several tens nm or less, and there is generated the strong near field light having been localized to the gap part (bow tie antenna system).

[Patent Document 1] JP-A-2001-118543

[Patent Document 2] JP-A-2002-221478

[Non-Patent Document 1] Technical Digest of 6th international conference on near field optics and related techniques, the Netherlands, Aug. 27-31, 2000, p100

Among the prior arts mentioned above, about the near field light generation element of the triangle aperture system of the Patent Document 1, there is already disclosed a manufacturing method, and it can be comparatively, easily manufactured. However, about the near field light generation element of the bow tie antenna system of the Non-Patent Document 1 and the Patent Document 2, from the fact that a working of several nm to several tens nm is required in shapes of the metal film apex and the gap part, generally it has been necessary to use a highly advanced micro-fabrication technique such as electron beam lithography apparatus or focused ion beam apparatus. In regard to this, there is demanded a manufacturing method which is simple and suitable for mass production.

SUMMARY OF THE INVENTION

In order to solve the above problems, in the present invention, a near field light generation element having a metal film on two opposite side faces of a truncated pyramid comprising a top face and the four side faces is manufactured by forming on a substrate an etching mask of a shape similar to the top face, forming the truncated pyramid by isotropic etching the substrate with the etching mask being made a mask material, and forming the metal film on the two opposite side faces of the truncated pyramid.

Additionally, in the present invention, it is possible to form the metal film on only one side face by forming a sacrificial layer on three arbitrary side faces of the truncated pyramid, forming the metal film on one remaining side face of the truncated pyramid, and removing, while removing the sacrificial layer, also the metal film having adhered on the sacrificial layer. Further, by repeating this, it is possible to form the metal films of two faces.

Additionally, in the present invention, in a case of forming the sacrificial layer on the three arbitrary side faces of the truncated pyramid, it is possible, by isotropically injecting a sacrificial layer material vertically from above a certain one side face, to form the sacrificial layer on this one side face and the two side faces whose sides contact with this one side face. On the remaining one side face, since it becomes a shade because of a directivity of the sacrificial layer material, there is formed no sacrificial layer.

Additionally, in the present invention, in a case of removing the sacrificial layer, it is possible to apply an ultrasonic wave.

Additionally, in the present invention, it is possible to plastically deform the metal layer by a mechanical impact.

Further, in the present invention, the metal film on the remaining one side face of the truncated pyramid is left by coating the side face and the top face of the truncated pyramid by the metal film, forming an etching mask on the metal film existing on three arbitrary side faces of the truncated pyramid, and etching the metal film with the etching mask being made a mask material. Further, by repeating this, it is possible to form the metal films of two faces.

Additionally, in the present invention, in a case of forming the etching mask on the metal film existing on the three arbitrary side faces of the truncated pyramid, it is possible, by isotropically injecting an etching mask material vertically from above the certain one side face, to form the etching mask on this one side face and the two side faces whose sides contact with this one side face. On the remaining one side face, since it becomes the shade because of the directivity of the etching mask material, there is formed no etching mask.

Additionally, in the present invention, it is possible to include a process of coating the side face of the truncated pyramid by a shading film with a top face vicinity being left. This process comprises coating a whole of the truncated pyramid by the shading film, and plastically deforming the shading film by the mechanical impact.

According to the present invention, by adjusting an aspect ratio of the etching mask, it is possible to easily control a sharpness of the metal films of two faces in the vicinity of the top face and an interstice between the metal films of two faces in the vicinity of the top face, which are the most important parameters of the near field light generation element of the bow tie antenna system. Without requiring the highly advanced micro-fabrication technique such as electron beam lithography apparatus or focused ion beam apparatus, even if a photolithography of a comparatively low level is used, it is possible to cause the above sharpness and the above interstice to be in the order of several nm to several tens nm.

Further, according to the present invention, since it is unnecessary to form the metal film by being injected parallel to the substrate, even if plural truncated pyramids are formed on the substrate, they do not become a shade to each other at a metal film formation time, and it is suitable for manufacturing the near field light generation element in large quantities.

Further, according to the present invention, by an amount for elastically deforming the shading film, it is possible to control an area in which the metal films of two faces contact with the truncated pyramid, so that it is possible to freely select a shape of the bow tie antenna.

DETAILED DESCRIPTION OF THE PREFERED EMBODIMENT

Hereunder, a best mode for carrying out this invention is explained on the basis of the drawings.

Embodiment 1

Figure 1A:
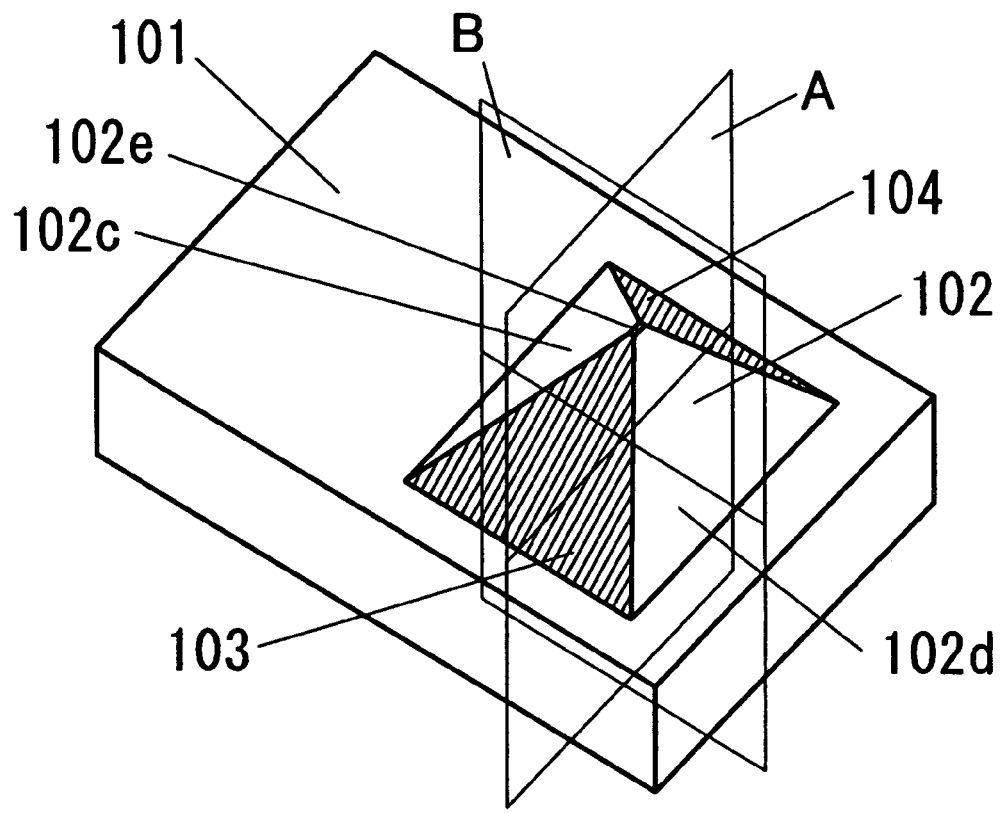
FIG. 1A-1B are a schematic view of a near field light generation element in an embodiment 1 of the present invention.
Figure 1B:
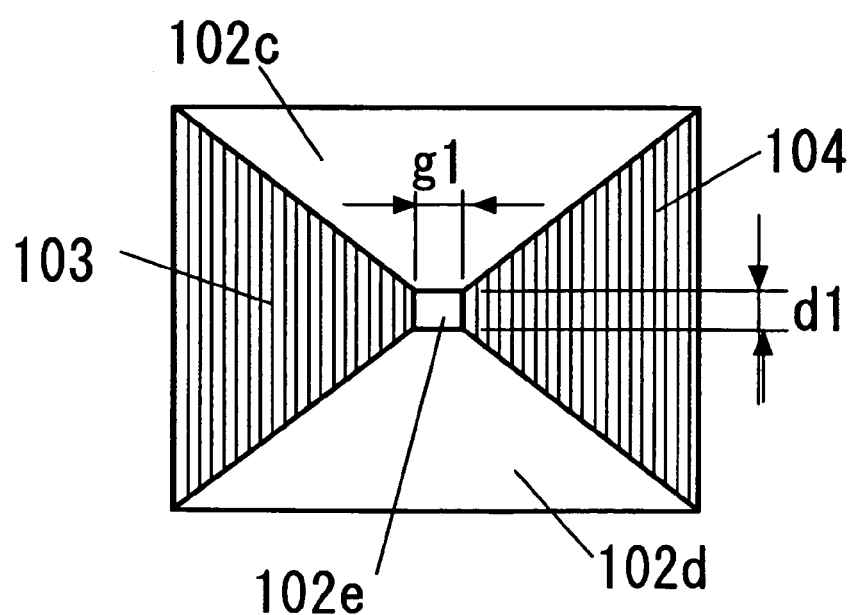

In FIG. 1A and FIG. 1B, there is shown a schema of a near field light generation element in the embodiment 1 of the present invention. FIG. 1A is a perspective view, and FIG. 1B is a top view. A truncated quadrangular pyramid 102 is disposed on an optically transparent substrate 101, and the truncated quadrangular pyramid 102 has side faces 102a (in FIG. 1A and FIG. 1B, it is concealed by a metal film 103 and invisible), 102b (in FIG. 1A and FIG. 1B, it is concealed by a metal film 104 and invisible), 102c, 102d, and a top face 102e. For the substrate 101, there is used a quartz glass or the like. The side face 102a and the side face 102b are oppositely disposed each other, and also the side face 102c and the side face 102d are oppositely disposed each other. The metal film 103 is formed on the side face 102a, and the metal film 104 is formed on the side face 102b. For each of the metal film 103 and the metal film 104, there is used an Au film whose film thickness is in the order of several nm to several tens nm. The metal film 103 and the metal film 104 form a so-called bow tie antenna. The top face 102e is a rectangle, and a length of a side contacting with the side face 102a and the side face 102b is made d1 and a length of a side contacting with the side face 102c and the side face 102d is made g1. Each of the metal film 103 and the metal film 104 on the side face 102a and the side face 102b has a sharpened shape in the vicinity of the top face 102e, and its sharpness is denoted by the d1. Further, the metal film 103 and the metal film 104 have an interstice in the vicinity of the top face 102e, and its dimension is denoted by the g1. Each of the d1, g1 has a value in the order of several nm to several tens nm.

Figure 2:
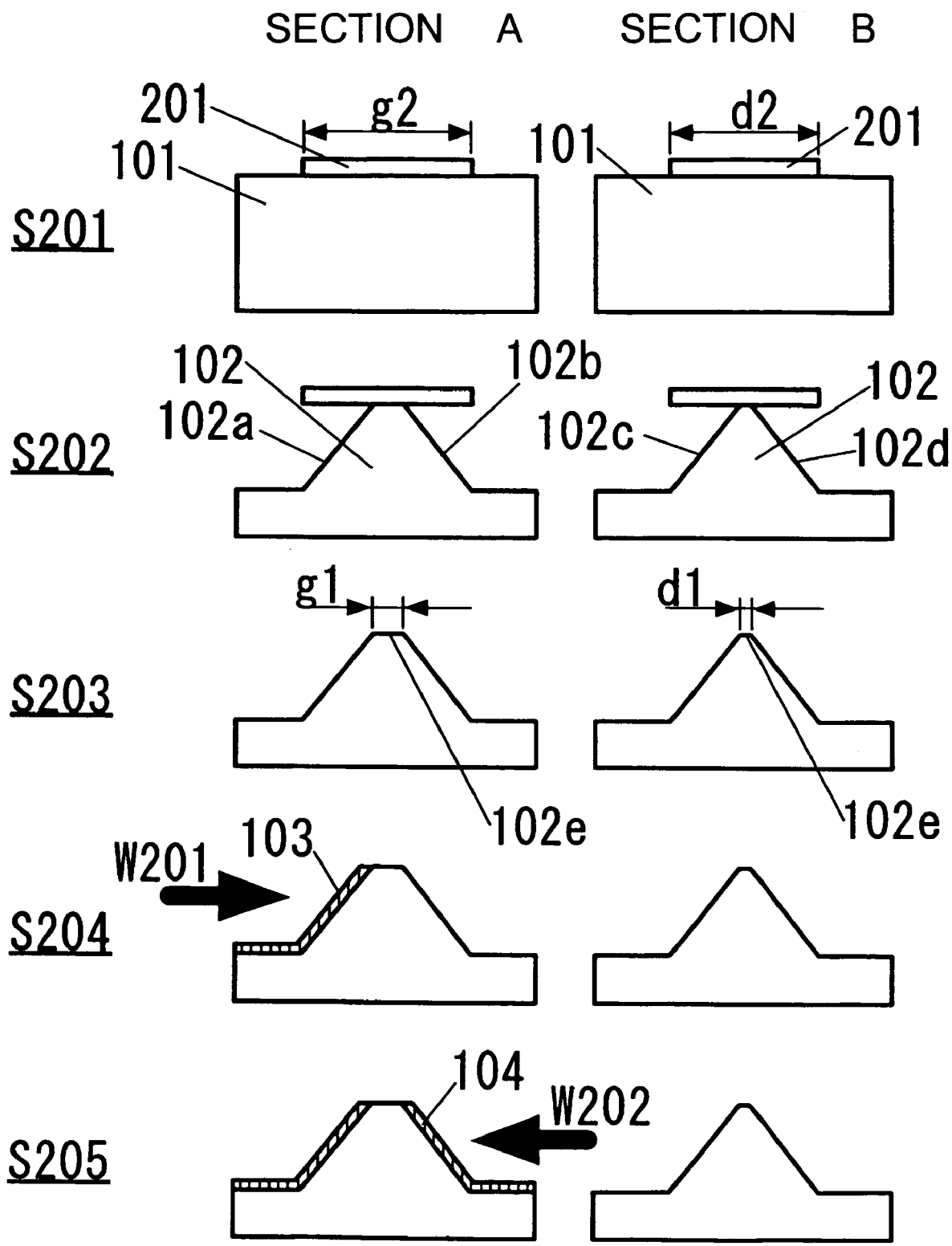
FIG. 2 is a sectional view showing a method of manufacturing the near field light generation element in the embodiment 1 of the present invention.

FIG. 2 is a sectional view showing a method of manufacturing the near field light generation element in the embodiment 1 of the present invention. A face which traverses the side face 102a, the side face 102b and the top face 102e and which is perpendicular to the substrate 101 is made a section A, and a face which traverses the side face 102c, the side face 102d and the top face 102e and which is perpendicular to the substrate 101 is made a section B. A sectional view in the section A is shown in FIG. 2 left, and that in the section B in FIG. 2 right.

First, as shown in a step S201, an etching mask 201 is formed on an upper face of the substrate 101. The etching mask 201 is a photoresist thin film having been worked by a photolithography. The etching mask 201 is a rectangle, and its two sides are parallel to the section A and their lengths are g2. Remaining two sides are parallel to the section B, and their lengths are d2.

Next, as shown in a step S202, an etching of the substrate 101 is performed. Although the etching may be a wet etching or a dry etching, it is necessary to be an isotropic etching. For example, if the substrate 101 is made the quartz glass, it is good if there is used the wet etching by a hydrofluoric acid aqueous solution. By the etching of the substrate 101, the truncated quadrangular pyramid 102 is formed below the etching mask 201.

Next, as shown in a step S203, the etching mask 201 is removed. For the removal of the etching mask 201, there is used an organic solvent, such as acetone, fuming nitric acid or the like. If the etching mask 201 is removed, the top face 102e of the truncated quadrangular pyramid 102 is exposed. As having been mentioned above, the top face 102e is the rectangle, and the length of one side becomes the length d1 and the length of the other perpendicularly intersecting one side the length g1. A point important here is the fact that a ratio between the d1 and the g1 is equal to a ratio between the lengths d2 and g2 of the sides of the etching mask 201. By adjusting an aspect ratio of the etching mask 201 and an etching amount of the substrate 101, it is possible to control a dimension of each of the d1 and the g1.

Next, as shown in a step S204, the metal film 103 is formed on the side face 102a. For the formation of the metal film 103, there is used a vacuum deposition method. On this occasion, if a vacuum deposition source is injected from a front of the side face 102a and a direction W201 parallel to the substrate 101, the metal film is not formed on the side faces 102b, 102c, 102d and the top face 102e.

Next, as shown in a step S205, the metal film 104 is formed on the side face 102b. Also for the formation of the metal film 104, there is used the vacuum deposition method. On this occasion, if the vacuum deposition source is: injected from a front of the side face 102b and a direction W202 parallel to the substrate 101, the metal film is not formed on the side faces 102a, 102c, 102d and the top face 102e and, in the end, the metal film 103 and the metal film 104 are formed on the side face 102a and the side face 102b.

In the present embodiment, by adjusting the aspect ratio of the etching mask 201, it is possible to easily control the sharpness of each of the metal film 103 and the metal film 104 in the vicinity of the top face 102e and the interstice between the metal film 103 and the metal film 104 in the vicinity of the top face 102e, which are the most important parameters of the near field light generation element of the bow tie antenna system. Without requiring the highly advanced micro-fabrication technique such as electron beam lithography apparatus or focused ion beam apparatus, even if the photolithography of the comparatively low level is used, it is possible to cause the above sharpness and the above interstice to be in the order of several nm to several tens nm.

Embodiment 2

Figure 3:
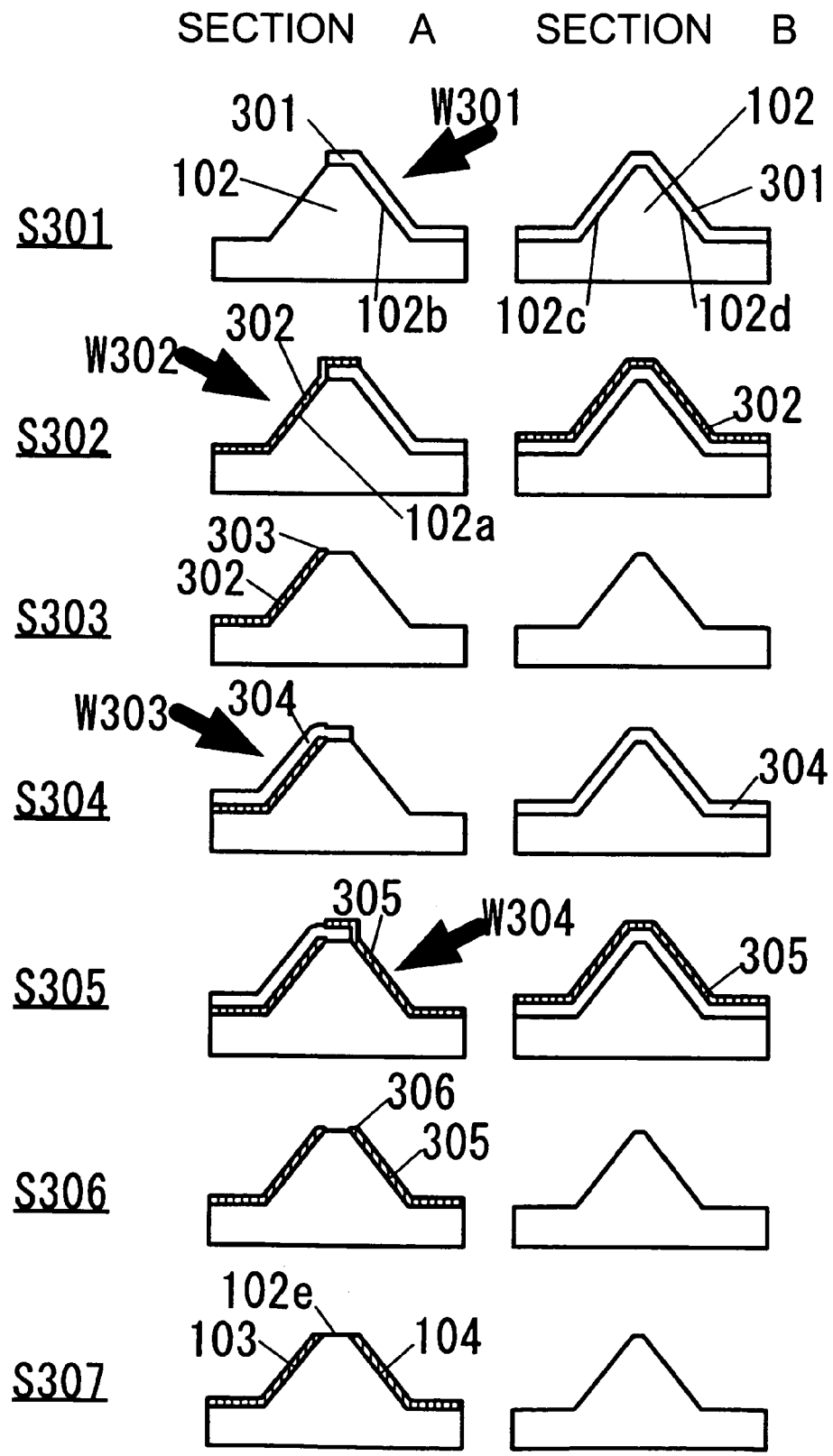
FIG. 3 is a sectional view showing a method of manufacturing a near field light generation element in an embodiment 2 of the present invention.

FIG. 3 is a sectional view showing a method of manufacturing a near field light generation element in the embodiment 2 of the present invention. A shape of the near field light generation element to be manufactured is approximately similar to one having been shown in FIG. 1A and FIG. 1B. A sectional view in the section A is shown in FIG. 3 left, and that in the section B in FIG. 3 right. First, similarly to the embodiment 1, the truncated quadrangular pyramid 102 is formed on the substrate 101. In other words, till the step S203 of FIG. 2, the working is performed similarly.

Next, as shown in a step S301, on the side face 102b there is formed a sacrificial layer 301 by using, from a direction W301 perpendicular to the side face 102b, a resin film formation method having a directivity, such as spray coat method. At this time, the sacrificial layer 301 is formed not only on the side face 102b but also on the side faces 102c, 102d and the top face 102e, which adjoin the side face 102b. The sacrificial layer 301 is not formed on the side face 102a becoming opposite to the side face 102b because it becomes a shade by the directivity of the film formation method. The sacrificial layer 301 consists of a resin film such as photoresist, and its film thicknessis several tens nm to several μm.

Next, as shown in a step S302, on the side face 102a there is formed a metal film 302 by using, from a direction W302 perpendicular to the side face 102a, a metal film formation method having the directivity, such as vacuum deposition method. At this time, the metal film 302 is being formed not only on the side face 102a but also on one part of the sacrificial layer 301.

Next, as shown in a step S303, the sacrificial layer 301 is exfoliated by using the organic solvent such as acetone. Further, on that occasion, it is possible to easily exfoliate the sacrificial layer 301 by applying an ultrasonic wave. At this time, the metal film 302 on the sacrificial layer 301 is also exfoliated, and only the metal film 302 mounting on the side face 102a remains. A burr 303 remains in a top face 102e side of the metal film 302.

Next, as shown in a step S304, on the side face 102a there is formed a sacrificial layer 304 by using, from a direction W303 perpendicular to the side face 102a, a photoresist formation method having the directivity, such as spray coat method. At this time, the sacrificial layer 304 is formed not only on the side face 102a but also on the side faces 102c, 102d and the top face 102e, which adjoin the side face 102a. The sacrificial layer 304 is not formed on the side face 102b becoming opposite to the side face 102a because it becomes the shade by the directivity of the film formation method. The sacrificial layer 304 consists of the photoresist, and its film thickness is several tens nm to several μm.

Next, as shown in a step S305, on the side face 102b there is formed a metal film 305 by using, from a direction W304 perpendicular to the side face 102b, the metal film formation method having the directivity, such as vacuum deposition method. At this time, the metal film 305 is being formed not only on the side face 102b but also on one part of the sacrificial layer 304.

Next, as shown in a step S306, the sacrificial layer 304 is exfoliated by using the organic solvent such as acetone. Further, on that occasion, it is possible to easily exfoliate the sacrificial layer 304 by applying the ultrasonic wave. At this time, the metal film 305 on the sacrificial layer 304 is also exfoliated, and only the metal film 305 mounting on the side face 102a remains. A burr 306 remains in the top face 102e side of the metal film 305.

Finally, as shown in a step S307, the burrs 303 and 306 are removed by being plastically deformed by exerting a mechanical external force from above and sides of the truncated quadrangular pyramid 102. Further, it is possible to remove the burrs 303 and 306 also by performing an ultrasonic cleaning or a blow cleaning of $CO_2$ jet. Here, the metal film 302 is worked to the metal film 103, and the metal film 305 is worked to the metal film 104.

In the present embodiment, differing from the embodiment 1, since the metal film 302 and the metal film 305 are not formed by being injected parallel to the substrate, even if plural truncated quadrangular pyramids 102 are formed on the substrate 101, they do not become the shade to each other at the metal film formation time, so that this is favorable in addition to the advantage of the embodiment 1, and it is suitable for manufacturing the near field light generation element in large quantities.

Embodiment 3

Figure 9:
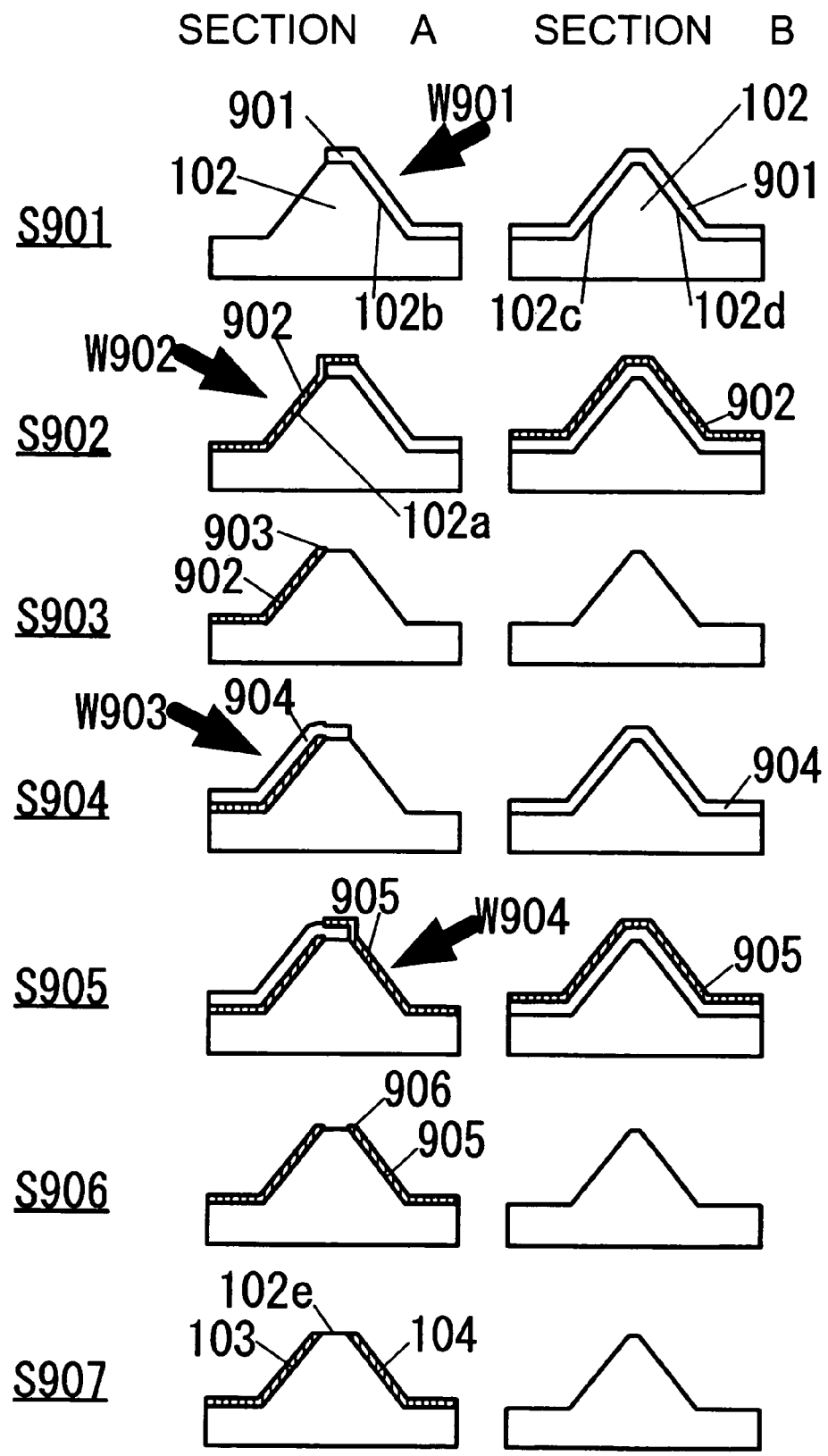
FIG. 9 is a sectional view showing a method of manufacturing a near field light generation element in an embodiment 3 of the present invention.

FIG. 9 is a sectional view showing a method of manufacturing a near field light generation element in the embodiment 3 of the present invention. The present embodiment is one similar to the embodiment 2, but differs in a point that, as the sacrificial layer, there is used the metal film instead of the resin film. Hereunder, there is detailedly explained.

A shape of the near field light generation element to be manufactured is approximately similar to one having been shown in FIG. 1A and FIG. 1B. A sectional view in the section A is shown in FIG. 9 left, and that in the section B in FIG. 9 right. First, similarly to the embodiment 1, the truncated quadrangular pyramid 102 is formed on the substrate 101. In other words, till the step S203 of FIG. 2, the working is performed similarly.

Next, as shown in a step S901, on the side face 102b there is formed a sacrificial layer 901 by using, from a direction W901 perpendicular to the side face 102b, a film formation method having the directivity, such as vacuum deposition method. At this time, the sacrificial layer 901 is formed not only on the side face 102b but also on the side faces 102c, 102d and the top face 102e, which adjoin the side face 102b. The sacrificial layer 901 is not formed on the side face 102a becoming opposite to the side face 102b because it becomes the shade by the directivity of the film formation method. The sacrificial layer 901 consists of an Al film, and its film thickness is several tens nm to several hundreds nm.

Next, as shown in a step S902, on the side face 102a there is formed a metal film 902 by using, from a direction W902 perpendicular to the side face 102a, the metal 1 formation method having the directivity, such as vacuum deposition method. At this time, the metal film 902 is being formed not only on the side face 102a but also on one part of the sacrificial layer 901.

Next, as shown in a step S903, the sacrificial layer 901 is exfoliated. At this time, the metal film 902 on the sacrificial layer 901 is also exfoliated, and only the metal film 902 on the side face 102a remains. Further, a burr 903 remains in the top face 102e side of the metal film 902. For the exfoliation of the sacrificial layer 901, there is used an aqueous solution whose main component has been made phosphoric acid.

Next, as shown in a step S904, on the side face 102a there is formed a sacrificial layer 904 by using, from a direction W903 perpendicular to the side face 102a, the film formation method having the directivity, such as vacuum deposition method. At this time, the sacrificial layer 904 is formed not only on the side face 102a but also on the side faces 102c, 102d and the top face 102e, which adjoin the side face 102a. The sacrificial layer 904 is not formed on the side face 102b becoming opposite to the side face 102a because it becomes the shade by the directivity of the film formation method. The sacrificial layer 904 consists of the Al film, and its film thickness is several tens nm to several hundreds nm.

Next, as shown in a step S905, on the side face 102b there is formed a metal film 905 by using, from a direction W904 perpendicular to the side face 102b, the metal film formation method having the directivity, such as vacuum deposition method. At this time, the metal film 905 is being formed not only on the side face 102b but also on one part of the sacrificial layer 904.

Next, as shown in a step S906, the sacrificial layer 904 is exfoliated. At this time, the metal film 905 on the sacrificial layer 904 is also exfoliated, and only the metal film 905 on the side face 102a remains. Further, a burr 906 remains in the top face 102e side of the metal film 905. For the exfoliation of the sacrificial layer 904, there is used the aqueous solution whose main component has been made phosphoric acid.

Finally, as shown in a step S907, the burrs 903 and 906 are removed by being plastically deformed by exerting the mechanical external force from above and sides of the truncated quadrangular pyramid 102. Further, it is possible to remove the burrs 903 and 906 also by performing the ultrasonic cleaning or the blow cleaning of $CO_2$ jet. Here, the metal film 902 is worked to the metal film 103, and the metal film 905 is worked to the metal film 104.

In the present embodiment, since the sacrifice layer is formed by the metal film formation method such as vacuum deposition method, it is possible to accurately perform the working of the metal film in addition to the advantage of the embodiment 2.

Embodiment 4

Figure 4:
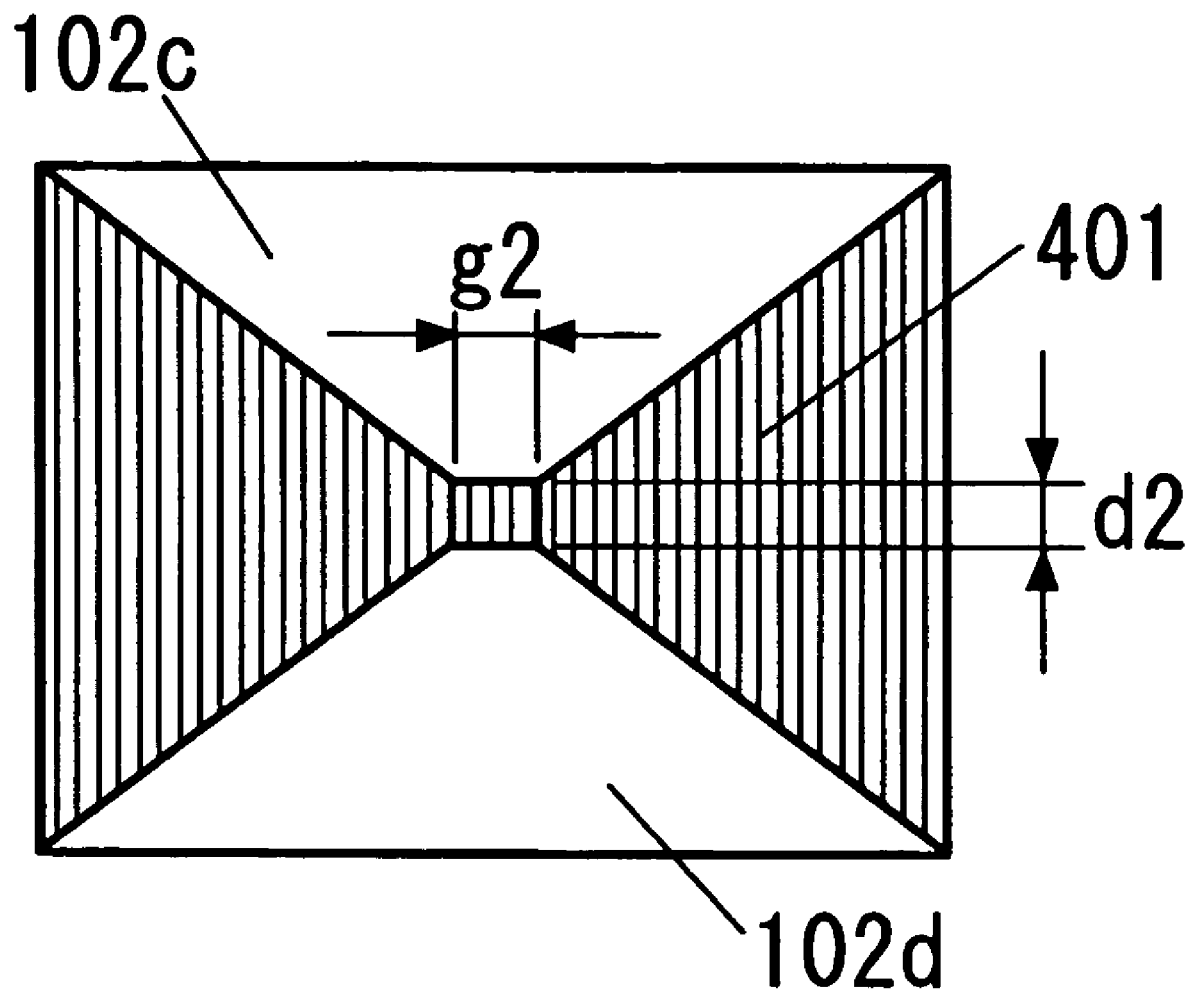
FIG. 4 is a top view of a near field light generation element in an embodiment 4 of the present invention.

In FIG. 4, there is shown a top view of a near field light generation element in the embodiment 4 of the present invention. Although a basic constitution is not different from one having been shown in FIG. 1A and FIG. 1B, a disposition of the metal film on the truncated quadrangular pyramids 102 differs. A metal layer 401 is formed not only on opposite upper faces of the side faces 102a and 102b but also on the top face 102e (in FIG. 4, it is concealed by the metal film 401 and invisible) of the truncated quadrangular pyramids 102. This metal film 401 forms the bow tie antenna.

Figure 5:
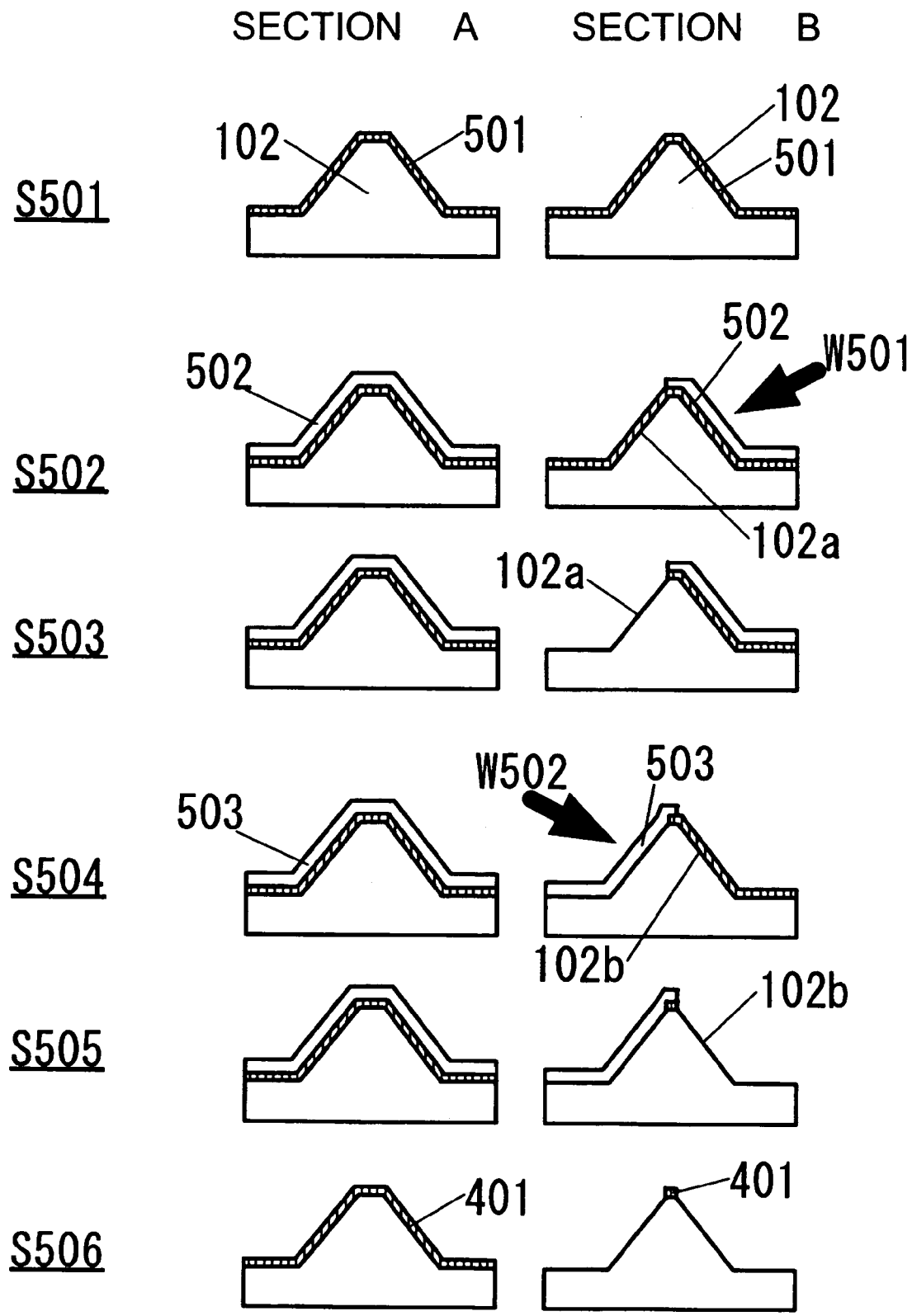
FIG. 5 is a sectional view showing a method of manufacturing the near field light generation element in the embodiment 4 of the present invention.

FIG. 5 is a sectional view showing a method of manufacturing a near field light generation element in the embodiment 4 of the present invention. A sectional view in the section A is shown in FIG. 5 left, and that in the section B in FIG. 5 right. The section A and the section B are defined similarly to FIG. 2. First, similarly to the embodiment 1, the truncated quadrangular pyramid 102 is formed on the substrate 101. In other words, till the step S203 of FIG. 2, the working is performed similarly.

Next, as shown in a step S501, a metal film 501 is formed so as to coat the truncated quadrangular pyramid 102. It may be formed by a sputter method.

Next, as shown in a step S502, there is formed an etching mask 502 by using, from a direction W501 perpendicular to the side face 102b, the resin film formation method having the directivity, such as spray coat method. At this time, the etching mask 502 is not formed on the metal film 501 on the side face 102a because it becomes the shade by the directivity of the film formation method.

The etching mask 502 consists of the resin film such as photoresist, and its film thickness is several tens nm to several Next, as shown in a step S503, there is performed an etching of the metal film 501. Since a material of the metal film 501 is Au, the etching is performed by using an iodine potassium iodide aqueous solution. At this time, there is removed only the metal film 501, on the side face 102a, not coated by the etching mask 502.

Next, as shown in a step S504, there is formed an etching mask 503 by using, from a direction W502 perpendicular to the side face 102a, the resin film formation method having the directivity, such as spray coat method. At this time, the etching mask 503 is not formed on the metal film 501 on the side face 102b because it becomes the shade by the directivity of the film formation method. The etching mask 503 consists of the resin film such as photoresist, and its film thickness is several tens nm to several μm.

Next, as shown in a step S505, the etching of the metal film 501 is performed by using the iodine-potassium iodide aqueous solution. At this time, there is removed only the metal film 501, on the side face 102b, not coated by the etching mask 503 and, as shown in a step S506, the metal film 501 is worked to the metal film 401.

In the present embodiment, differing from the embodiment 1, since the metal film 501 is not formed by being injected parallel to the substrate, even if plural truncated quadrangular pyramids 102 are formed on the substrate 101, they do not become the shade to each other at the metal film formation time, so that this is favorable in addition to the advantage of the embodiment 1, and it is suitable for manufacturing the near field light generation element in large quantities.

Further, differing from the embodiments 2 and 3, since no burr is generated, the process of removing the burr becomes unnecessary, so that it is possible to reduce a manufacturing cost.

Embodiment 5

Figure 10:
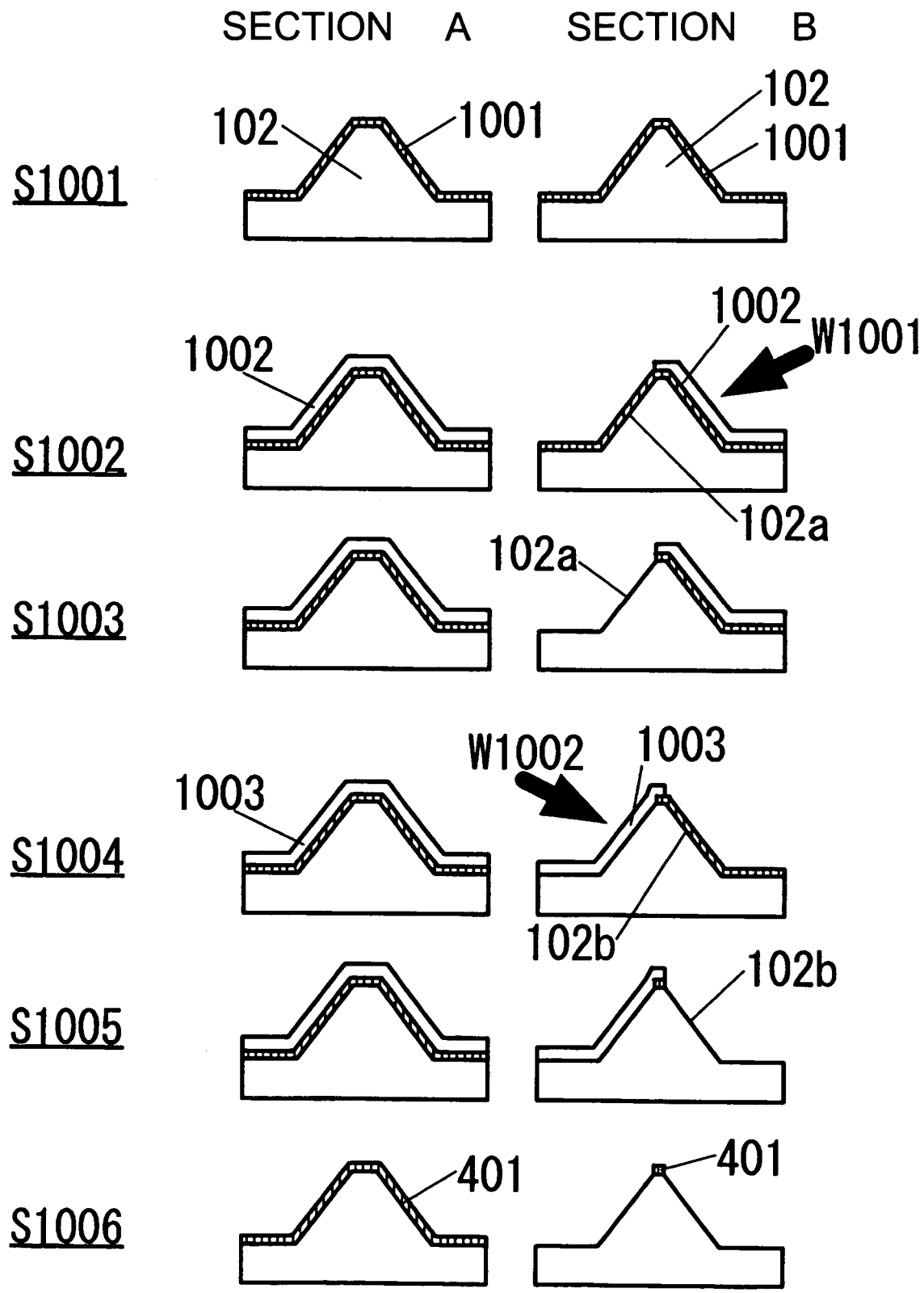
FIG. 10 is a sectional view showing a method of manufacturing a near field light generation element in an embodiment 5 of the present invention.

FIG. 10 is a sectional view showing a method of manufacturing a near field light generation element in the embodiment 5 of the present invention. A sectional view in the section A is shown in FIG. 10 left, and that in the section B in FIG. 10 right. The section A and the section B are defined similarly to FIG. 2. The present embodiment is one similar to the embodiment 4, but differs in a point that, as the etching mask, there is used the metal film instead of the resin film. Hereunder, there is detailedly explained.

First, similarly to the embodiment 1, the truncated quadrangular pyramid 102 is formed on the substrate 101. In other words, till the step S203 of FIG. 2, the working is performed similarly.

Next, as shown in a step S1001, a metal film 1001 is formed so as to coat the truncated quadrangular pyramid 102. It may be formed by the sputter method.

Next, as shown in a step S1002, there is formed an etching mask 1002 by using, from a direction W1001 perpendicular to the side face 102b, the film formation method having the directivity, such as vacuum deposition method. At this time, the etching mask 1002 is not formed on the metal film 1001 on the side face 102a because it becomes the shade by the directivity of the film formation method. The etching mask 1002 consists of a Cr film, and its film thickness is several tens nm to several hundreds nm.

Next, as shown in a step S1003, there is performed the etching of the metal film 1001. Since a material of the metal film 1001 is Au, the etching is performed by using the iodine-potassium iodide aqueous solution. At this time, since the etching mask 1002 is formed by the Cr film not attacked by the iodine-potassium iodide aqueous solution, there is removed only the metal film 1001, on the side face 102a, not coated by the etching mask 1002.

Next, as shown in a step S1004, there is formed an etching mask 1003 by using, from a direction W1002 perpendicular to the side face 102a, the film formation method having the directivity, such as vacuum deposition method. At this time, the etching mask 1003 is not formed on the metal film 1001 on the side face 102b because it becomes the shade by the directivity of the film formation method. The etching mask 1003 consists of the Cr film, and its film thickness is several tens nm to several hundreds nm.

Next, as shown in a step S1005, the etching of the metal film 1001 is performed by using the iodine-potassium iodide aqueous solution. At this time, since the etching mask 1003 is formed by the Cr film not attacked by the iodine-potassium iodide aqueous solution, there is removed only the metal film 1001, on the side face 102b, not coated by the etching mask 1003 and, as shown in a step S1006, the metal film 1001 is worked to the metal film 401.

In the present embodiment, since the etching mask is formed by the metal film formation method such as vacuum deposition method, it is possible to accurately perform the working of the metal film in addition to the advantage of the embodiment 4.

Embodiment 6

Figure 6:
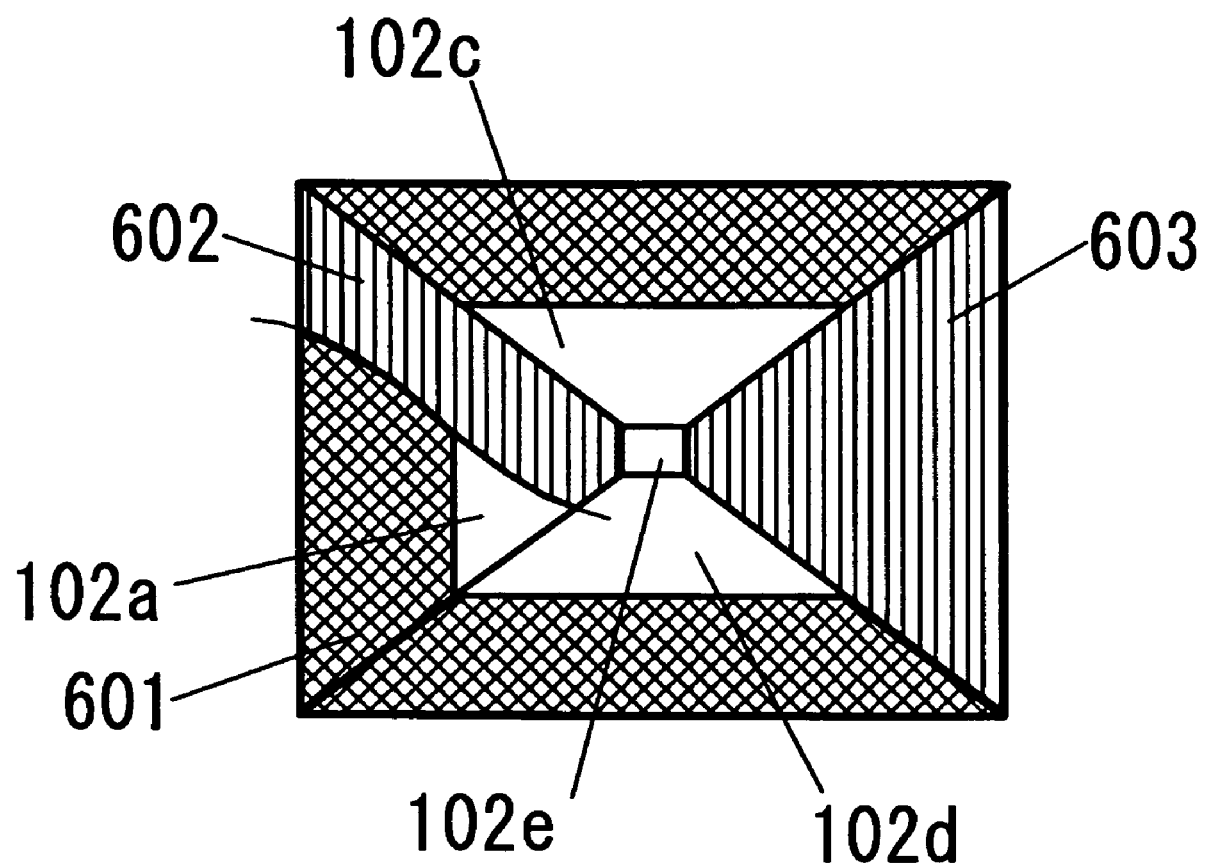
FIG. 6 is a top view of a near field light generation element in an embodiment 6 of the present invention.

In FIG. 6, there is shown a top view of a near field light generation element in the embodiment 6 of the present invention. A basic structure is not different from one shown in FIG. 1A and FIG. 1B, but differs in the following point. On the truncated quadrangular pyramid 102, there is formed a shading film 601. The shading film 601 coats a region except a top face 102e vicinity among the side faces 102a, 102b (in FIG. 6, it is concealed by a metal film 603 and invisible), 102c, 102d of the truncated quadrangular pyramid 102. The shading film 601 is the Al film of several hundreds nm in film thickness. In an upper face of the side face 102a and an upper face of the shading film 601 on the side face 102a, there is formed a metal film 602. Incidentally, in order to explain an aspect of the shading film 601, in FIG. 6 there is shown only one part of the metal film 602.

Further, the metal film 603 is formed on the side face 102b and an upper face of the shading film 601 on the side face 102b. The metal film 602 and the metal film 603 are Au films whose film thicknesses are several nm to several tens nm. The metal film 602 and the metal film 603 form the so-called bow tie antenna. By the shading film 601, since no light emits from a portion except the top face 102e vicinity, a background light decreases, so that it is possible to increase an S/N.

Figure 7:
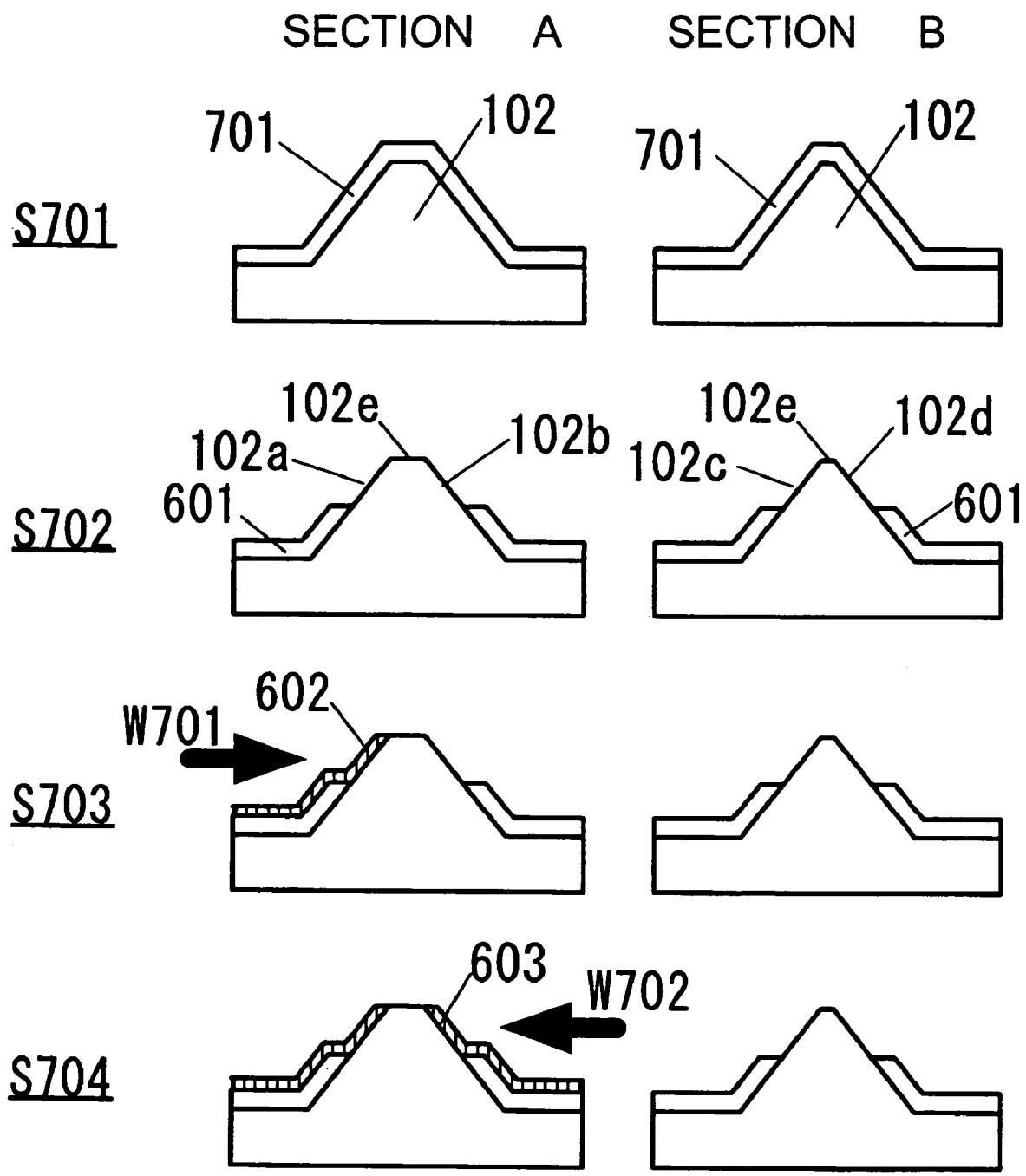
FIG. 7 is a sectional view showing a method of manufacturing the near field light generation element in the embodiment 6 of the present invention.

FIG. 7 is a sectional view showing a method of manufacturing the near field light generation element in the embodiment 6 of the present invention. A sectional view in the section A is shown in FIG. 7 left, and that in the section B in FIG. 7 right. The section A and the section B are defined similarly to FIG. 2. First, similarly to the embodiment 1, the truncated quadrangular pyramid 102 is formed on the substrate 101. In other words, till the step S203 of FIG. 2, the working is performed similarly.

Next, as shown in a step S701, a shading film base material 701 is formed so as to coat the truncated quadrangular pyramid 102. For a material of the shading film 601, there is used Al, and its film thickness is in the order of 300 nm. It may be formed by the sputter method.

Next, as shown in a step S702, by plastically deforming the shading film base material 701, there are exposed the top face 102e and one part, of each of the side faces 102a, 102b, 102c and 102d, in the top face 102e vicinity, thereby forming the shading film 601. This method is detailedly described in JP-A-2002-71545. An exposure amount is made several hundreds nm.

Next, as shown in a step S703, the metal film 602 is formed on a face, of the side face 102a, having been exposed from the shading film 601. For a material of the metal film 602, there is used Au. For the formation of the metal film 602, there is used the vacuum deposition method. On this occasion, if the vapor deposition source is injected from the front of the side face 102a and a direction W701 parallel to the substrate 101, the metal film is not formed on the side faces 102b, 102c, 102d and the top face 102e.

Next, as shown in a step S704, the metal film 603 is formed on a face, of the side face 102b, having been exposed from the shading film 601. For a material of the metal film 603, there is used Au. For the formation of the metal film 603, there is used the vacuum deposition method. On this occasion, if the vapor deposition source is injected from the front of the side face 102b and a direction W702 parallel to the substrate 101, the metal film is not formed on the side faces 102a, 102c, 102d and the top face 102e and, in the end, the metal film 602 and the metal film 603 are formed on the top face 102e vicinity of each of the side face 102a and the side face 102b.

In the present embodiment, by the amount for elastically deforming the shading film 701, it is possible to control the area in which the metal film 602 and the metal film 603 contact with the truncated quadrangular pyramid 102, so that it is possible to freely select the shape of the bow tie antenna in addition to the advantage of the embodiment 1.

Embodiment 7

Figure 8:
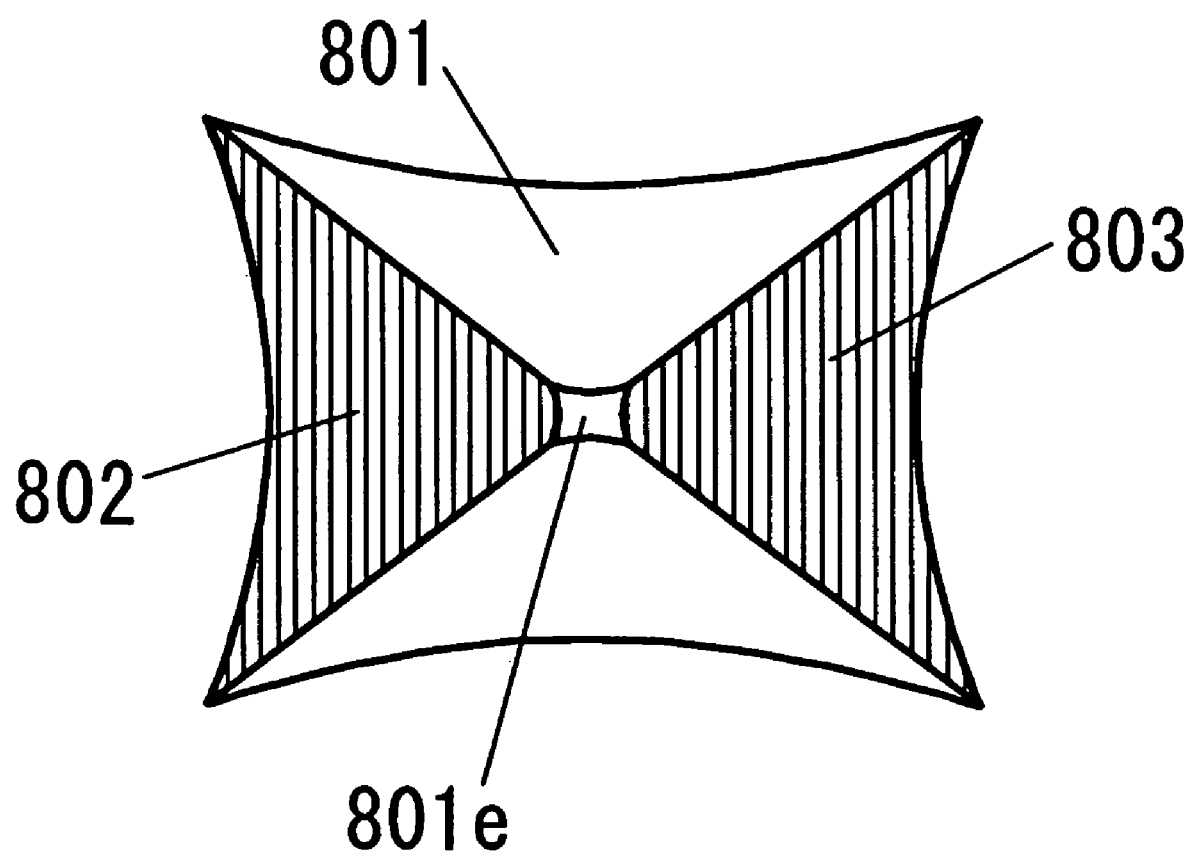
FIG. 8 is a top view of a near field light generation element in an embodiment 7 of the present invention.

In FIG. 8, there is shown a top view of a near field light generation element in the embodiment 7 of the present invention. A basic structure is not different from one shown in FIG. 1A and FIG. 1B, but differs in a point that a top face 801e of a truncated pyramid 801 becomes a hand drum shape, not the rectangle. A metal film 802 and a metal film 803 are formed respectively on the two opposite faces among the side faces of the truncated pyramid 801. Also in the shape like this, it can be manufactured by using such a manufacturing method as having been shown in the embodiment 1, 2 or 3.

What is claimed is:

1. A method of manufacturing a near field light generation element having a metal film on two opposite side faces of a truncated pyramid having a top face and four side faces, the method comprising the steps of:

a process of forming on a substrate an etching mask having a shape the same as but larger than that of the top face, a process of forming the truncated pyramid from the substrate by isotropic etching the substrate using the etching mask, and a process of forming the metal film on the two opposite side faces of the truncated pyramid.

2. A method of manufacturing a near field light generation element according to claim 1, further comprising the steps of:

a process of forming a sacrificial layer on three side faces of the truncated pyramid, a process of forming thereafter the metal film on at least one remaining side face of the truncated pyramid, and a process of removing the sacrificial layer while removing any metal film that adhered on the sacrificial layer.

3. A method of manufacturing a near field light generation element according to claim 2, wherein, in the process of removing the sacrificial layer while removing any metal film that adhered on the sacrificial layer, the removal is performed by applying ultrasonic waves.

4. A method of manufacturing a near field light generation element according to claim 2, further comprising the step of a process of plastically deforming the metal film.

5. A method of manufacturing a near field light generation element according to claim 2, further comprising the step of a process of coating the side faces of the truncated pyramid by a shading film with the top face vicinity thereof being left uncoated.

6. A method of manufacturing a near field light generation element according to claim 2, wherein the process of forming the sacrificial layer on the three side faces of the truncated pyramid forms, by injecting a material of the sacrificial layer from a direction perpendicular to a predetermined side face toward the predetermined side face, the sacrificial layer on the three side faces consisting of the predetermined side face and the two side faces that adjoin and contact the predetermined side face.

7. A method of manufacturing a near field light generation element according to claim 6, wherein the process of forming the sacrificial layer is performed by using a vacuum deposition apparatus.

8. A method of manufacturing a near field light generation element according to claim 6, further comprising the step of a process of plastically deforming the metal film.

9. A method of manufacturing a near field light generation element according to claim 1, further comprising the step of a process of plastically deforming the metal film.

10. A method of manufacturing a near field light generation element according to claim 1, further comprising the steps of:

a process of coating the side faces and the top face of the truncated pyramid by the metal film, a process of forming an etching mask on the metal film that exists on three side faces of the truncated pyramid, and a process of leaving a metal film on one remaining side face of the truncated pyramid by etching the metal film using the etching mask.

11. A method of manufacturing a near field light generation element according to claim 10, further comprising the step of a process of coating the side faces of the truncated pyramid by a shading film with the top face vicinity thereof being left uncoated.

12. A method of manufacturing a near field light generation element according to claim 10, wherein the process of forming the etching mask on the metal film that exists on three side faces of the truncated pyramid forms, by injecting a material of the etching mask from a direction perpendicular to a predetermined side face toward the predetermined side face, the etching mask on the three side faces consisting of the predetermined side face and the two side faces that adjoin and contact the predetermined side face.

13. A method of manufacturing a near field light generation element according to claim 12, further comprising the step of a process of coating the side faces of the truncated pyramid by a shading film with the top face vicinity thereof being left uncoated.

14. A method of manufacturing a near field light generation element according to claim 12, wherein the process of forming the etching mask is performed by using a vacuum deposition apparatus.

15. A method of manufacturing a near field light generation element according to claim 1, further comprising the step of a process of coating the side faces of the truncated pyramid by a shading film with the top face vicinity thereof being left uncoated.

16. A method of manufacturing a near field light generation element according to claim 15, wherein the process of coating the side faces of the truncated pyramid by the shading film with the top face vicinity thereof being left uncoated comprises a process of coating a whole of the truncated pyramid by the shading film, and a process of plastically deforming the shading film.

17. A method of manufacturing a near field light generation element according to claim 15, wherein the shading film is formed by using a film formation source consisting of Al.

18. A method of manufacturing a near field light generation element according to claim 1, wherein the metal film is formed by using a film formation source consisting of Au or Ag.

19. A method of manufacturing a near field light generation element according to claim 1, wherein the metal film is formed by using a vacuum deposition apparatus.

20. A method of manufacturing a near field light generation element, comprising the steps of:

forming an etching mask on a surface of a substrate;

isotropic etching the substrate, using the etching mask, to form a truncated pyramid having a top face that underlies the etching mask and has a shape the same as but smaller than that of the etching mask and four side faces at least two of which are opposite one another;

removing the etching mask to expose the top face of the truncated pyramid; and forming a metal film on the two opposite side faces of the truncated pyramid.

* * * * *

UNITED STATES PATENT AND TRADEMARK OFFICE
CERTIFICATE OF CORRECTION

PATENT NO.      : 7,635,437 B2
APPLICATION NO. : 11/360278
DATED           : December 22, 2009
INVENTOR(S)     : Hirata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 971 days.

Signed and Sealed this

Ninth Day of November, 2010

David J. Kappos
*Director of the United States Patent and Trademark Office*